United States Patent
Fan

(10) Patent No.: US 6,267,417 B1
(45) Date of Patent: Jul. 31, 2001

(54) ANGLE SETTING PIPE STRUCTURE AND ITS FABRICATION METHOD

(76) Inventor: Jui-Hua Fan, No. 38-1, Sec. 2, Yung An S. Rd., LuChou Hsiang, Taipei (TW)

( * ) Notice: Subject to any disclaimer, the term of this patent is extended or adjusted under 35 U.S.C. 154(b) by 0 days.

(21) Appl. No.: 09/317,154

(22) Filed: May 24, 1999

(51) Int. Cl.[7] ................................................. F16L 25/00
(52) U.S. Cl. ........................ 285/330; 285/420; 285/913
(58) Field of Search .................................. 285/330, 420, 285/913, 184

(56) References Cited

U.S. PATENT DOCUMENTS 1,451,731 * 4/1923 Higdon .
3,967,837 * 7/1976 Westerlund .
4,858,960 * 8/1989 Pharaon .

FOREIGN PATENT DOCUMENTS

330235 * 12/1920 (DE) ..................................... 285/420
1344942 * 10/1963 (FR) ..................................... 285/330

* cited by examiner

Primary Examiner—Flemming Saether
(74) Attorney, Agent, or Firm—Dougherty & Troxell

(57) ABSTRACT

An angle setting pipe structure and fabricating method that using a mechanical coupler for connecting two pipe members at a selected axial angle. The pipe members are being made by roll forming at one end to form an annular pipe groove which has a plurality of spaced pipe teeth. The mechanical coupler has clamping flanges to engage with the pipe groove and a plurality of horizontal spaced teeth extending outward from the clamping flanges for engaging with the pipe teeth. The pipe members thus may be securely connected at a selected angle without the risk of angle skewing.

5 Claims, 7 Drawing Sheets

ANGLE SETTING PIPE STRUCTURE AND ITS FABRICATION METHOD

BACKGROUND OF THE INVENTION

1. Field of the Invention

This invention relates to an angle setting pipe structure and its fabrication method, and particularly to an angle setting pipe structure for connecting two pipe members securely at an angle desired.

2. Description of the Prior Art

Using mechanical couplers for connecting pipes in a piping system is widely used nowadays, particularly in the buildings. It offers fast, simple and low cost connection for pipes, valves and other related piping components. The installation is also flexible and convenient.

A conventional mechanical coupler mainly establishes a mechanical connection between two pipes. Each pipe has an annular groove at the connection end. The mechanical coupler clamps the two ends of the pipes at the annular groove to make the connection. Although it is simple to use, the axial connection angle of the pipes may skew under external force or after long time of use and wearing. In many occasions, some type of piping components need connection at certain angle, such as check valve, three-way pipe and the like. It is a requirement commonly found in a horizontal piping system laid in the ceiling of a building. For piping systems built in a vertical duct of a building, the relatively small space of the duct makes fixing pipes at an angle desired difficult and cumbersome. When pipes do not connect at a correct angle, it could cause misalignment or even leaking.

Furthermore, as sometimes the pipe components such like valves or three-way pipes may have to be assembled with straight pipes in a horizontal direction, the connecting ends of these components will become saggy or loose due to the gravity force after a long time of use. It will result in leaking of the piping system.

SUMMARY OF THE INVENTION

In view of aforesaid disadvantages, it is therefore an object of this invention to provide an angle setting pipe structure and its fabrication method that allows the connecting pipes to axially turn and position at an angle desired so that the piping system may be installed securely and reliably without angle skewing or turning loose.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
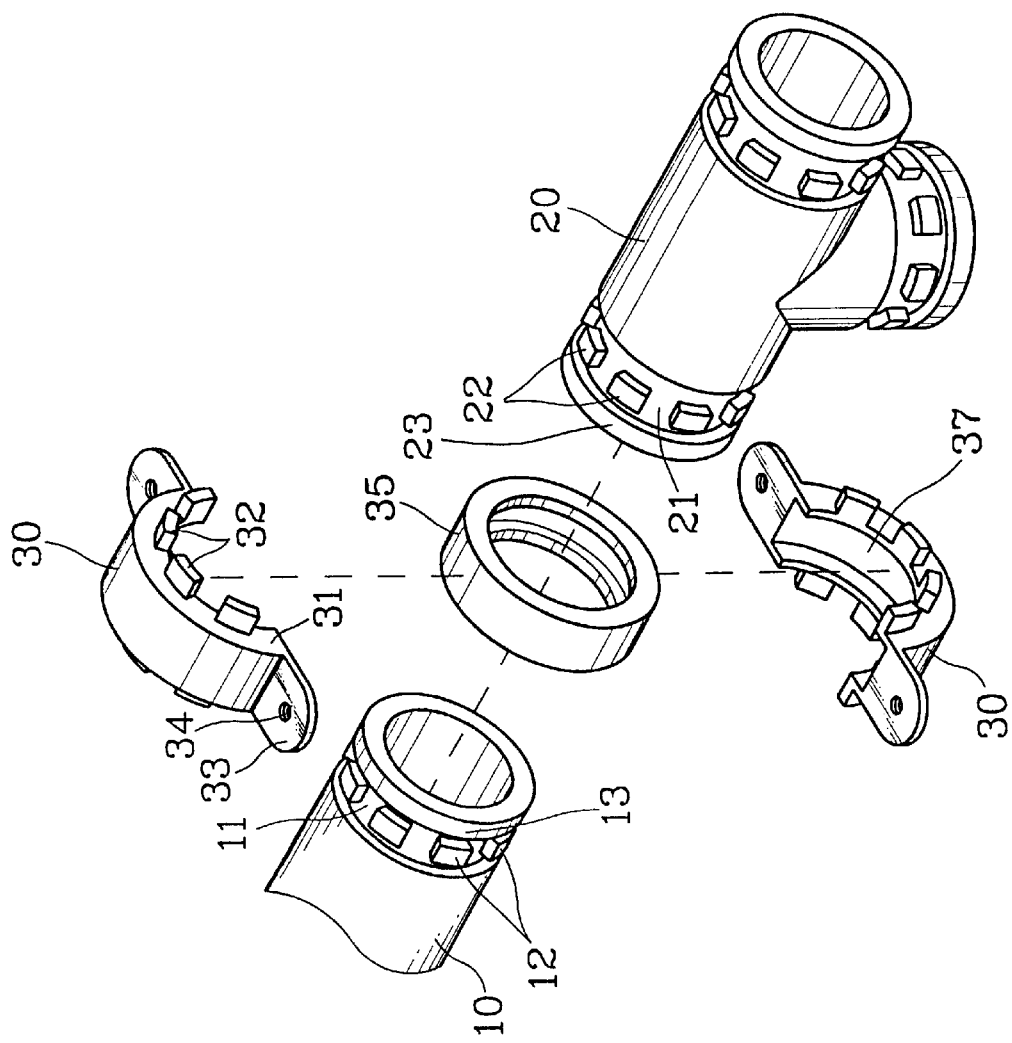
FIG. 1 is an exploded perspective view of an embodiment of this invention.

FIG. 1 illustrates an embodiment of an angle setting pipe structure of this invention using a mechanical coupler 30 to connect a linear pipe 10 with a three-way pipe 20. It is to be noted that FIG. 1 shows only an example of the application of this invention. This invention may be used in other circumstances such as connecting check valves and the like equally well.

The linear pipe 10 has at least one first annular pipe groove 11 formed around a first end thereof bordering a first pipe ring 13 while the three-way pipe 20 has at least one second annular pipe groove 21 formed around a second end thereof bordering a second pipe ring 23. In the first annular pipe groove 11, there are a plurality of equally spaced first pipe teeth 12 formed therein. The second pipe groove 21 also has a plurality of equally spaced second pipe teeth 22 formed therein.

The mechanical coupler 30 includes two semicircle clamping member. Each clamping member has a pair of spaced semicircular clamping flanges 31 to sandwich a semicircle third groove 37 therebetween. A plurality of equally spaced third teeth 32 are axially projecting outward from each of the clamping flange 31. Each clamping member further has a pair of ears 33 extending radically at two ends thereof. Each of the ears 33 has a screw bore 34 formed therein. The number and size of the teeth 12, 22 and 32 are same and is preferably be numbered in even integer such as four, eight and the like. The space between a pair of teeth 12 and 22 is engageable with a tooth of the teeth 32.

Figure 2:
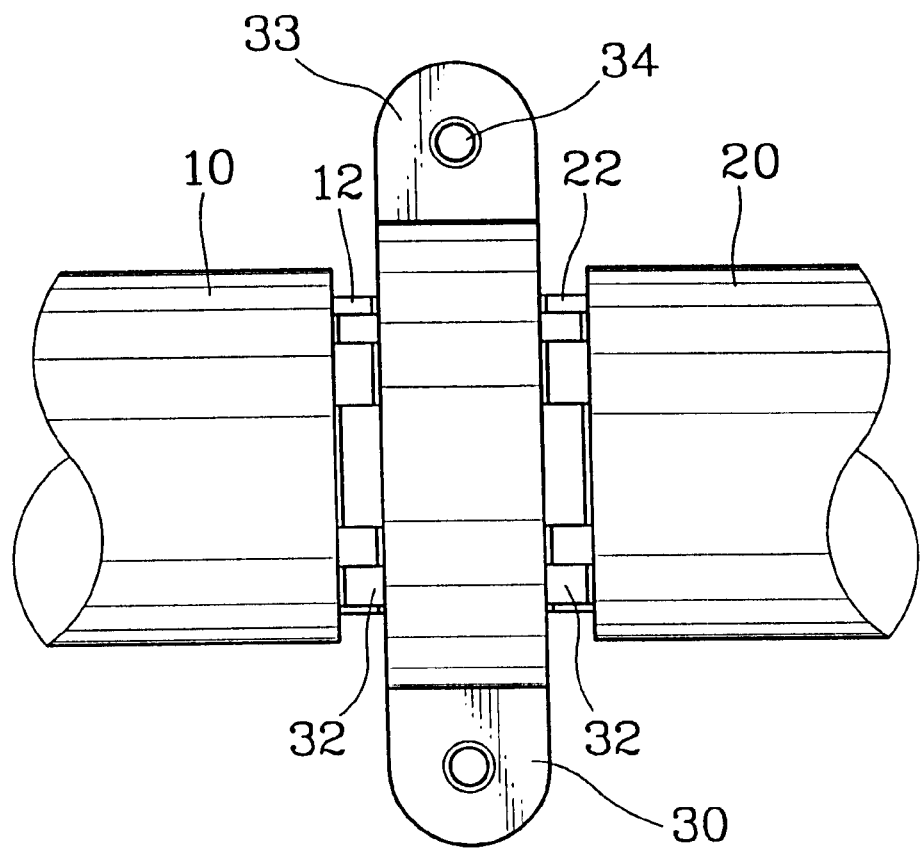
FIG. 2 is a top view of the embodiment shown in FIG. 1.

When in use, aligning the linear pipe 10 end to end against the three-way pipe 20 axially at an angle desired, then put a seal ring 35 around the juncture of the pipes 10 and 20 to engage the first pipe ring 13 and the second pipe ring 23 within the seal ring 35. Then placing two clamping members of the mechanical coupler 30 around the seal ring 35 within the third groove 37 and having the third teeth 32 engaging with the space formed between a pair of teeth 12, and 22 (as shown in FIG. 2). Then engaging the two clamping members tightly by means of screw bolts (not shown in the figures) through the screw bores 34. The mechanical coupler 30 thus can hold the pipes 10 and 20 securely at the selected angle without skewing or turning loose even under heavy external force. The seal ring 35 further helps to prevent pipe leaking.

Figure 3:
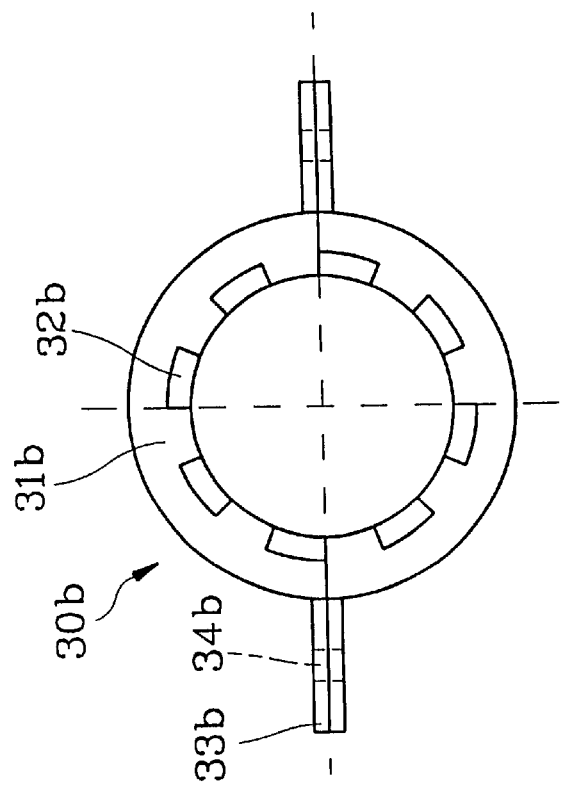
FIGS. 3A and 3B are side views of two different embodiments of a mechanical coupler of this invention.
Figure 3:
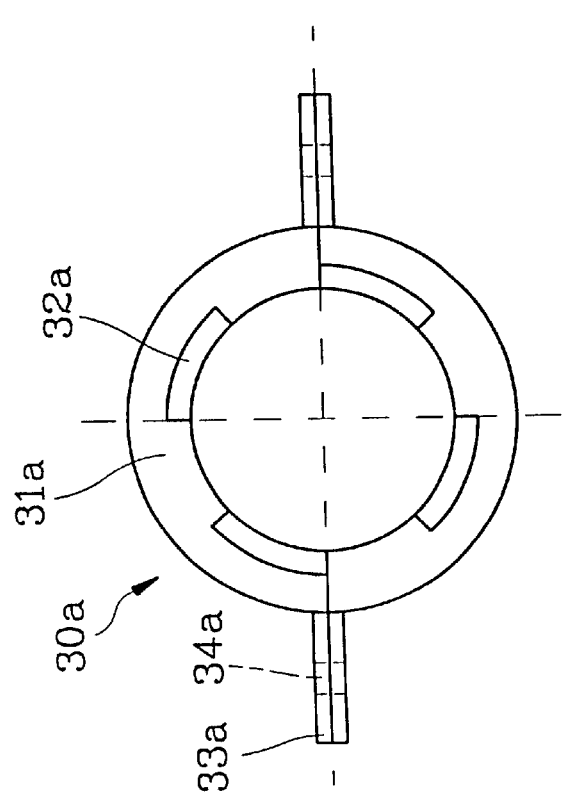

FIG. 3A shows an embodiment of four-teeth for the mechanical coupler 30a. The coupler 30a has ears 33a, screw bores 34a, and four teeth 32a formed on each of the two flanges 31a. Pipe angle setting may be made by integers of ninety degree. FIG. 3B shows an eight teeth embodiment for the mechanical coupler 30b. The coupler 30b also has ears 33b, screw bores 34b, and eight teeth 32b formed on each of the two flanges 31b. Pipe angle setting may be made by integers of forty-five degree. The axial alignment angle of the pipes is preferably made based on the edges of the teeth rather than through the middle of the teeth. The two clamping members may become symmetrical (i.e., substantially same when turning one of the them up side down and rotating 180 degree). Hence one set of mold or production set up may be used to produce two sets of clamping members for the mechanical coupler. It helps to lower production cost.

Figure 4:
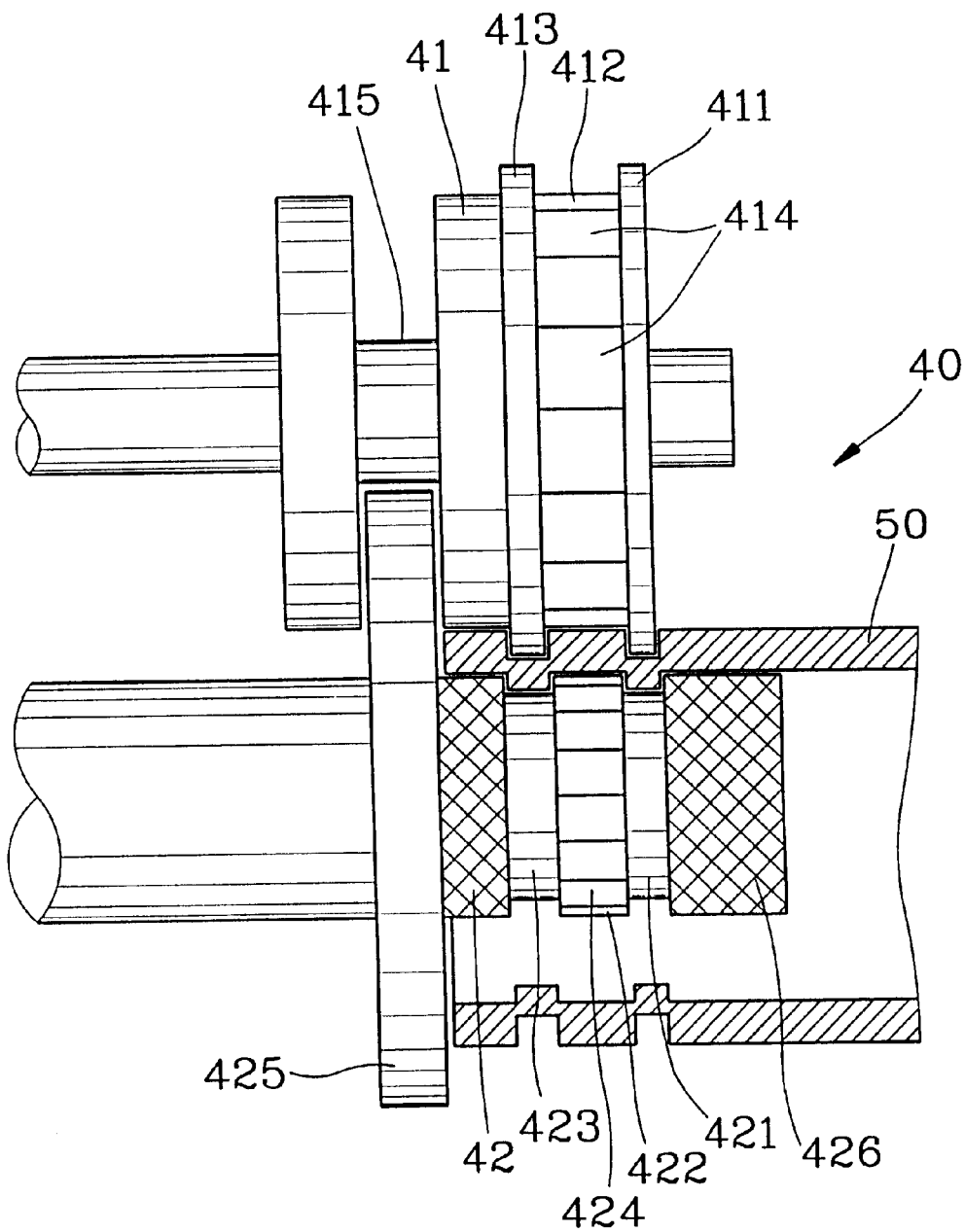
FIG. 4 is a side view, partly cut away, of a roller forming means of this invention.
Figure 5:
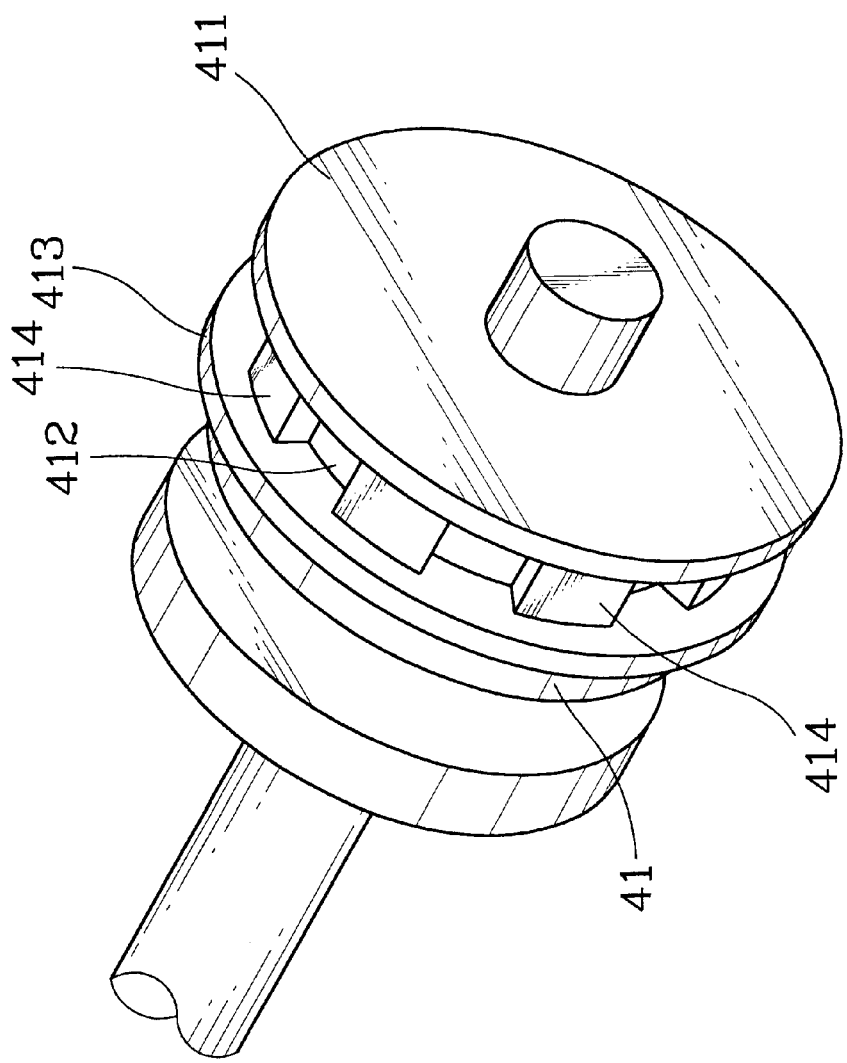
FIG 5 is a perspective view of a first roller used in the roller forming means shown FIG. 4.

The components being used in this invention, i.e., the pipes with teethed and bordering ring ends, and the mechanical coupler with sideward extending teeth may be made by casting or CNC machining. However the method of casting usually uses cast iron as material. Cast iron has low mechanical strength and poor surface quality, and is brittle, bulky, and heavy. It is not desirable for high value products. CNC machining has relatively low production efficiency and high cost. Both of them are not desirable production methods for mass production of high value products. This invention offers a hot extrusion or hot roller forming method that can produce high strength and high quality piping members for this invention structure at high efficiency and at low cost. FIGS. 4 and 5 illustrate the method and means of this invention.

Please refer to FIGS. 4 and 5. The roller forming means 40 of this invention includes a first roller 41 which has a first forming ring 411 spaced from a second forming ring 413 with an annular first forming groove 412 located therebetween and a second roller 42 which has a smaller diameter than the inside diameter of a pipe end 50. In the first forming groove 412, there are a plurality of spaced forming teeth 414. The first roller 41 also has an annular positioning groove 415. The second roller 42 has a roller head 426 and two spaced annular forming troughs 421 and 423 mating respectively with the first and the second forming rings 411 and 413. Between the troughs 421 and 423 is a third forming ring 422 which has a plurality of recesses 424 mating with the forming teeth 414. The second roller 42 further has an annular positioning ring 425 movably engagable with the positioning groove 415.

When in use for production, a linear pipe or component (e.g. an elbow pipe or a three-way pipe) is firstly formed by means of hot rolling, hot pressing or hot extrusion to produce a pipe end 50. Then the second roller 42 is placed in the pipe end 50 until the pipe end meeting the positioning ring 425 (shown in FIG. 4). Placing the first roller 41 toward the second roller 42 with the positioning ring 425 engaging with the positioning groove 415 so that the first and second forming rings 411 and 413 may roll pressing upon the pipe wall against the forming troughs 421 and 423 respectively to form two annular grooves around the pipe end 50. In the mean time the first forming groove 412 and the third forming ring 422 will press on the pipe wall such as 12 or 22 shown in FIG. 1. The two forming rings 411 and 413 may make the roll forming of the teeth more stable and reliable and results in better quality. The first and second rollers 41 and 42 may be driven by a gear set (not shown in the figure) to get synchronous rotation for roll pressing.

Figure 6:
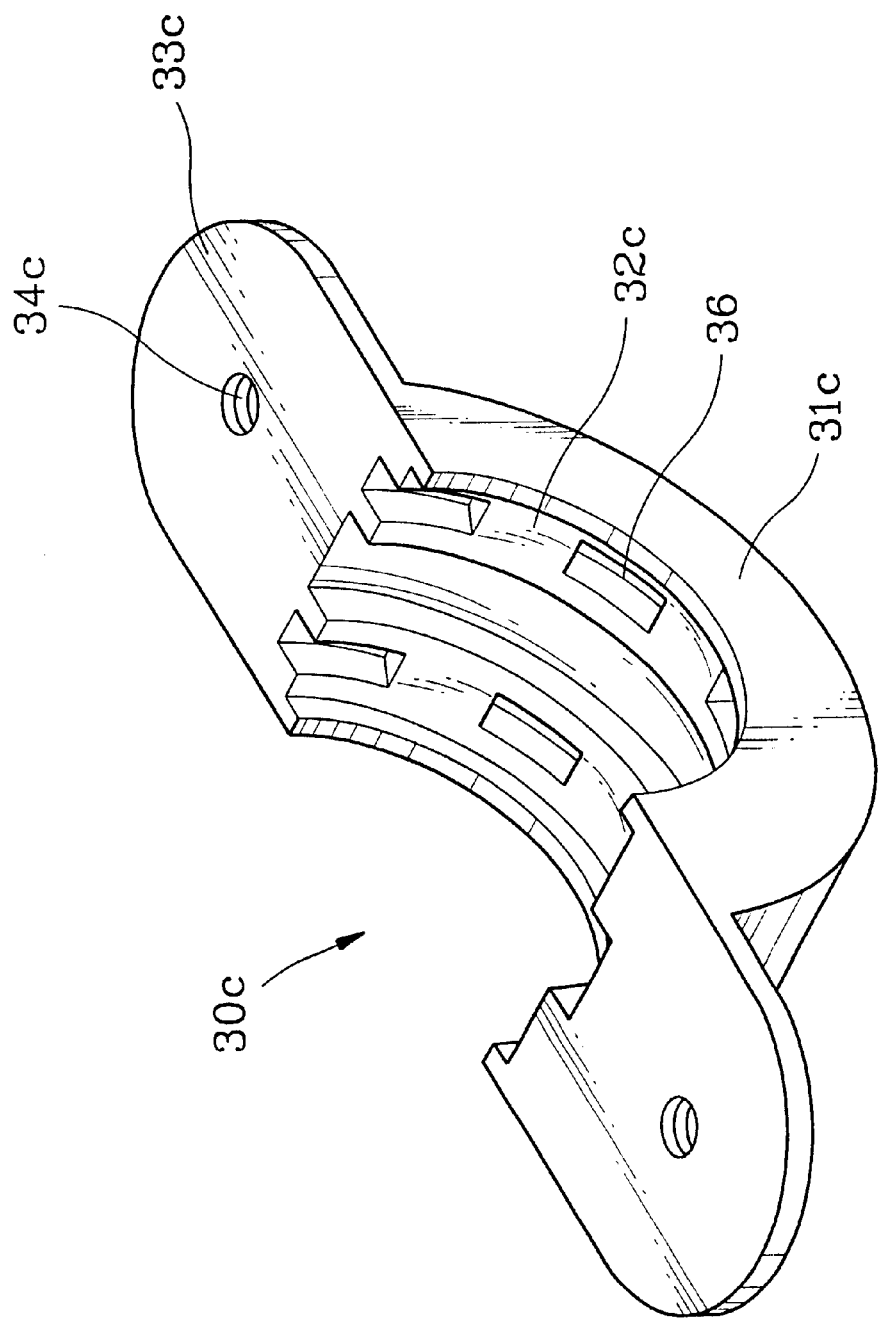
FIG. 6 is a fragmentary perspective view of another embodiment of a mechanical coupler of this invention.

FIG. 6 illustrates another embodiment of a mechanical coupler 30c of this invention. It is generally like the one shown in FIG. 1 and is also including two flanges 31c, ears 33c and screw bores 34c. However instead of forming the third teeth 32 sidward for engaging with the first and second pipe teeth 12 and 22, the third groove between the flanges 31c is stepped up to a selected thickness to form a pair of teeth rings 32c which is wide enough to fully cover the first and second pipe grooves 11 and 21 of the two connecting pipes. The teeth rings 32c have a plurality of recesses 36 formed therein. When two pieces of mechanical coupler 30c clamp the two connecting pipes, the recesses 36 engage with the teeth 12 and 22 to establish a secured connection of the pipes at an axial angle desired.

Figure 7:
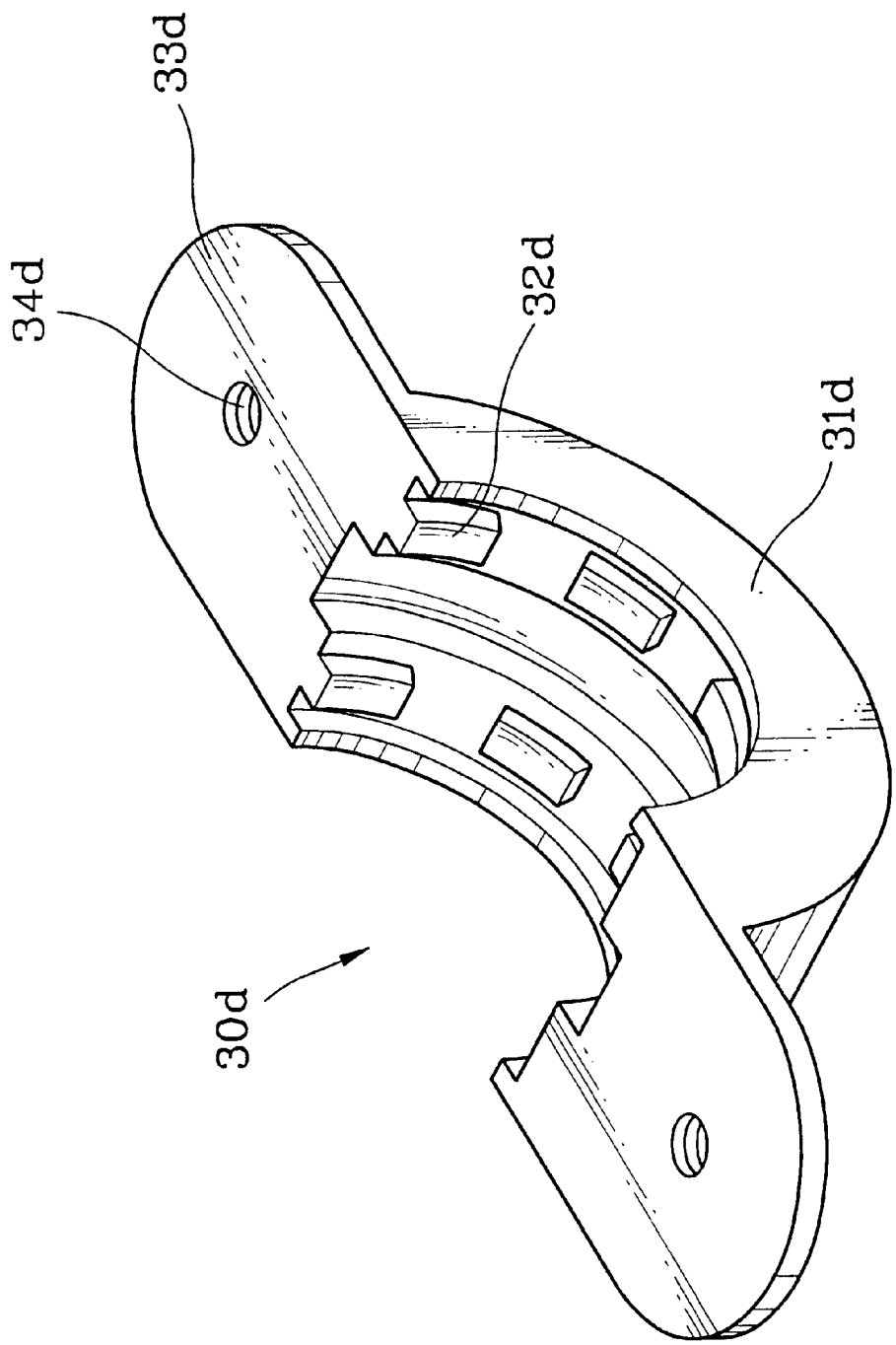
FIG. 7 is a fragmentary perspective view of a further embodiment of a mechanical coupler of this invention.

FIG. 7 illustrates a further embodiment of this invention. It is largely like the one shown in FIG. 6 and is also including two flanges 31d, ears 33d and screw bores 34d. But instead of recesses 36, a plurality of spaced stubs 32d are formed on the stepped up annular ring 32d for engaging with the spaces formed respectively in the teeth 12 and 22.

In summary, this invention offers a pipe coupling structure which may connect securely two pipes or pipe members at an axial angle desired. It thus effectively resolves the problem of angle skewing and the consequent leaking that might otherwise happen to a conventional mechanical pipe coupling. It also has advantages of low cost maintenance and greater durability.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An angle setting pipe structure connecting two pipe members at a selected axial angle, comprising:

each pipe member having at least one annular pipe groove of a predetermined width at one end with a plurality of spaced pipe teeth formed in the pipe groove; and a mechanical coupler engageable with the pipe groove for connecting the two pipe members at a selected axial angle, wherein the mechanical coupler includes two semicircular clamping members, each clamping member having a pair of semicircular clamping flanges engageable with the pipe groove and a plurality of spaced horizontal teeth extending outward from the clamping flange, the horizontal teeth being engageable with the pipe teeth.

2. The angle setting piping structure of claim 1, wherein at least one of the pipe members is a linear pipe.

3. The angle setting piping structure of claim 1, wherein at least one of the pipe members is a pipe component.

4. The angle setting pipe structure of claim 1, wherein the pipe groove and pipe teeth are formed by means of a roller forming device which includes a first roller and a second roller, the first roller having two spaced forming rings sandwiching a forming groove therebetween, the forming groove having a plurality of spaced forming teeth; the second roller having a smaller diameter than an inside diameter of the pipe member and having two spaced annular forming troughs engageable with the forming rings and a third forming ring engageable with the forming groove, the third forming ring having a plurality of spaced recesses mating and engageable with the forming teeth.

5. The angle setting piping structure of claim 4, wherein the first roller further has a positioning groove engageable with a positioning ring formed in the second roller for aligning the forming groove with the third forming ring.

* * * * *